: US 6,512,551 B1
(45) Date of Patent: *Jan. 28, 2003

(12) United States Patent
Lund

(54) PLATFORM FOR DISPLAYING INFORMATION FROM MULTIPLE SOURCES

(75) Inventor: Robert W. Lund, Spring, TX (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,263

(22) Filed: Nov. 12, 1996

(51) Int. Cl.$^7$ ................................................ H04N 7/08
(52) U.S. Cl. ................. 348/564; 348/563; 348/478; 348/473; 725/36; 725/136; 725/142
(58) Field of Search ................. 348/563, 564, 348/565, 568, 567, 566, 9, 10, 478, 473; 455/6.3, 6.2; 725/36, 22, 151, 136, 142, 100, 131; H04N 7/08

(56) References Cited

U.S. PATENT DOCUMENTS

| 5,192,999 A | | 3/1993 | Graczyk et al. | 358/85 |
| 5,233,423 A | * | 8/1993 | Jernigan et al. | 348/564 |
| 5,325,423 A | | 6/1994 | Lewis | 379/90 |
| 5,434,590 A | | 7/1995 | Dinwiddie et al. | 345/115 |
| 5,438,372 A | * | 8/1995 | Tsumori et al. | 348/565 |
| 5,548,340 A | | 8/1996 | Bertram | 348/559 |
| 5,724,103 A | * | 3/1998 | Batchelor | 348/564 |
| 5,745,184 A | * | 4/1998 | Neal | 348/468 |
| 5,761,607 A | * | 6/1998 | Gudesen | 455/6.2 |
| 5,774,189 A | * | 6/1998 | Ishii et al. | 348/563 |
| 5,805,154 A | * | 9/1998 | Brown | 348/10 |
| 5,940,073 A | * | 8/1999 | Klosterman et al. | 345/721 |
| 5,977,962 A | * | 11/1999 | Chapman et al. | 345/716 |
| 5,995,092 A | * | 11/1999 | Yuen et al. | 345/716 |
| 6,005,561 A | * | 12/1999 | Hawkins et al. | 345/721 |
| 6,018,371 A | * | 1/2000 | Maeda et al. | 348/553 |
| 6,151,059 A | * | 11/2000 | Schein et al. | 345/721 |
| 6,172,677 B1 | * | 1/2001 | Stautner et al. | 345/716 |
| 6,177,931 B1 | * | 1/2001 | Alexander et al. | 345/721 |
| 6,239,794 B1 | * | 5/2001 | Yuen et al. | 345/721 |
| 6,285,407 B1 | * | 9/2001 | Yasuki et al. | 348/460 |
| 6,323,911 B1 | * | 11/2001 | Schein et al. | 348/552 |
| 6,330,595 B1 | * | 12/2001 | Ullman et al. | 709/219 |

FOREIGN PATENT DOCUMENTS

| EP | 0572024 A2 | 12/1993 |
| EP | 0601647 A1 | 6/1994 |
| EP | 0648054 A2 | 4/1995 |
| EP | 0781042 A2 | 6/1997 |
| WO | 95/30308 | 11/1995 |
| WO | 96/09721 | 3/1996 |

OTHER PUBLICATIONS

Internet, Trends On-Line; "The Big-Tube PCTV", Michael Antonoff; May 28, 1996.
USA Today, High Tech; "Now you can tune your TV to Internet", Mike Snider; Sep. 18, 1996.
Internet; "Gateway 2000 Sells Destination Big Screen PC Through Retail Chains"; Aug. 21, 1996.
Internet; "Gateway 2000 launches Destination big screen PC featuring 31-inch monitor"; Aug. 21, 1996.

* cited by examiner

Primary Examiner—John Miller
Assistant Examiner—Linus H. Lo
(74) Attorney, Agent, or Firm—Sharp, Comfort & Merrett, P.C.

(57) ABSTRACT

A display system for concurrently displaying stored display information and received information, having a display monitor, receiver for receiving television signals, and a sub-system having a storage unit and a processor, which sub-system can operate simultaneously with the receiver. The stored display information comprises application information portion and sponsor information portion which may be downloaded via a vertical blanking interval or a portion of the bandwidth associated with digital signals.

23 Claims, 1 Drawing Sheet

PLATFORM FOR DISPLAYING INFORMATION FROM MULTIPLE SOURCES

BACKGROUND OF THE INVENTION

1. Technical Field of the Invention

The present invention relates to display systems, and, in particular, to a system for providing stored display signals to a display monitor during television viewing.

2. Description of Related Art

Conventional television (TV) programming, including the commercials and advertisements, provides the primary viewing experience to users of a television set. As is well known, this primary viewing experience may be provided to the user via a host of media, such as for example, the cable system, the Digital Satellite System, or any network broadcast medium. Furthermore, the received TV signals may conform to any standard form, for example, National Television Standards Committee (NTSC) form, or Phase Alteration Line (PAL) form.

Recently there has been a rise in the usage of a television set for the purposes of providing a secondary viewing experience. A well known example is where a user employs special purpose hardware coupled to a conventional TV set to play video games using the associated display monitor. When a TV monitor is thus used for a video game (for example, a Sega or Nintendo game), the monitor essentially becomes a dedicated game console. It can be appreciated that providing such secondary viewing experiences to users enhances and augments the functionality of a conventional TV set.

While providing a secondary viewing experience can render a "user-passive" TV set (notwithstanding the user-initiated actions such as channel selection) into a "user-interactive" device, current methodologies for bringing information into a TV set for providing the secondary viewing experience are beset with several problems. For example, it is well known that when a TV monitor is used as a video game console, the secondary viewing experience (that is, the interactive video game) completely overrides the primary viewing experience (that is, the TV programming). Clearly, this condition renders it extremely difficult, if not impossible, to return to the primary viewing experience at a desired point therein. It can be appreciated, accordingly, that it is desirable to have a mechanism to combine and provide both the viewing experiences concurrently on the TV monitor so as to enable a user to know when to get back to the primary viewing experience.

Another shortcoming with the traditional solutions for bringing a secondary viewing experience into a TV viewing environment is that varying the content of the secondary viewing experience typically involves considerable hardware manipulation, such as, for instance, replacing game cartridges. The prior art does not provide for obtaining fresh content for secondary viewing experiences on the fly such that it may be "instantaneously" displayed for viewing by the user.

Yet another shortcoming of the traditional secondary-viewing-experience methodologies is that these methodologies to date have not allowed for ready updating and changing of sponsorship in the form of modifiable credit lines, advertising spaces, and the like. Since the content of a secondary viewing experience may be third-party-supported (that is, supported by advertisers), traditional revenue models in regard to advertising in conventional TV programming may not be readily applied.

Accordingly, based upon the foregoing, it should be understood and appreciated that there is a need for a display system with the following advantages: (i) one viewing experience is not completely overridden by another, (ii) "on-the-fly" provision of the fresh content for a secondary viewing experience, and (iii) provision for modifiable sponsorship information.

Although display systems that provide capability to alternate between primary and secondary experiences have been extant for sometime, no such system is known to have all of these and other advantages provided by the present invention which is described and claimed hereinbelow.

SUMMARY OF THE INVENTION

The present invention overcomes the above-identified problems as well as other shortcomings and deficiencies of existing technologies by providing a display system (or, interchangeably, a "PCTV" system) having a display monitor, receiver means for receiving television signals, which television signals are provided to the display monitor for displaying, and a sub-system with a storage unit and a processor, the sub-system providing display information stored in the storage unit to the display monitor for simultaneous display thereof. A presently preferred exemplary embodiment of the present invention may integrate the display monitor, the receiver means and the sub-system into a single unit, and may also include access control means and a data communication port, wherein the access control means and the data communication port are operably coupled to the processor of the sub-system. In one aspect, the receiver means comprises an analog television receiving unit. In an alternative aspect, the receiver means comprises a digital television receiving unit. The display information stored in the storage unit may preferably comprise application information and sponsor information, the sponsor information being delivered via either a vertical blanking interval received by the receiver means or via a digital signal bandwidth received by the receiver means.

In a still further aspect, the present invention relates to a method for providing display information to a display system having a display monitor, a receiver for receiving television signals, and a sub-system with a storage unit in which the display information is stored, the method comprising the steps of: creating a first window on the display monitor; providing the television signals received by the receiver to the display monitor for displaying in the first window; and, creating a second window on the display monitor, so that the display information is routed to be displayed in the second window. In a presently preferred exemplary embodiment, the method further comprises the step of creating a third window on the display monitor, so that at least a portion of the display information is routed to be displayed in the third window.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
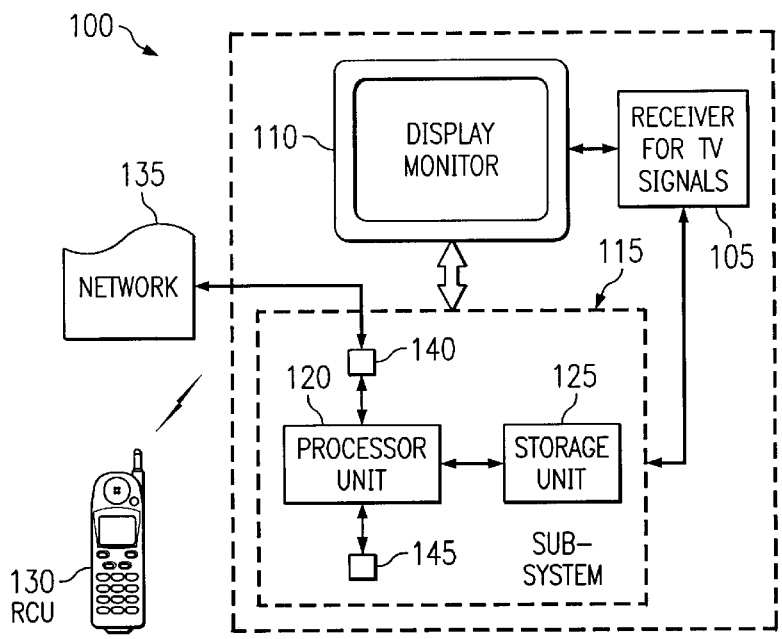
FIG. 1 is a block diagram illustrating an exemplary display system utilizing the teachings of the present invention.

Referring now to the Drawings wherein like or similar elements are designated with identical reference numerals throughout the several views, and wherein the various elements depicted are not necessarily drawn to scale, and, in particular, to FIG. 1, there is shown a block diagram of a display system (or, interchangeably, a PCTV system) generally at 100, utilizing the teachings of the present invention. The purpose of this block diagram is to illustrate the features of the present invention and the basic principles of operation of an exemplary embodiment thereof. This block diagram is not necessarily intended to schematically represent specific modules of hardware or any particular data or control paths therebetween.

The display system 100 includes a display monitor 110 operable to receive and display thereon television signals received by a receiver 105. The receiver 105 is capable of receiving conventional television signals in any standard form such as those described hereinabove. Further, the display system 100 is provided with a sub-system 115 having a processor unit 120 coupled to a storage unit 125. The sub-system 115 may preferably contain a data communication port 140 for enabling data communication between the display system 100 and a network 135, and an access control unit 145 for controlling viewer/user access to the sub-system 115 or the PCTV system 100.

Continuing to refer to FIG. 1, the network 135 can be understood to be any network, for example, a Local Area Network, a Metropolitan Area Network, a Wide Area Network, or the Internet. The access control unit 145 may preferably be of the type that accepts an alphanumeric code associated with an authorized viewer/user. Although not shown in this Figure, it should also be understood that the display system 100 may preferably contain such hardware modules as a power. unit for supplying power thereto; a TV tuner board for converting signals received by the receiver 105 to a scan VGA (or higher resolution) signal for display on the display monitor 100; CD-ROM players; floppy drives; printer ports; wired or wireless keyboards; et cetera. The PCTV system 100 may preferably be operable using a remote control unit ("RCU") 130.

Further, in accordance with the teachings of the present invention, to provide instantaneous launching of the display of display information pertaining to a secondary experience during the reception and display of television signals received by the receiver 105, the display information is preferably stored in the storage unit 125. The storage unit 125 may comprise any conventional mass storage medium, for example, a magnetic hard drive, an optical drive, and the like. The launching of the stored display information can be effectuated using either a designated key (for example, the "#" key) or a dedicated key that may be provided preferably on the remote control unit 130 which may be wireless (operating, for example, via radio waves, magnetic waves, or infra-red waves) in a presently preferred exemplary embodiment.

Figure 2:
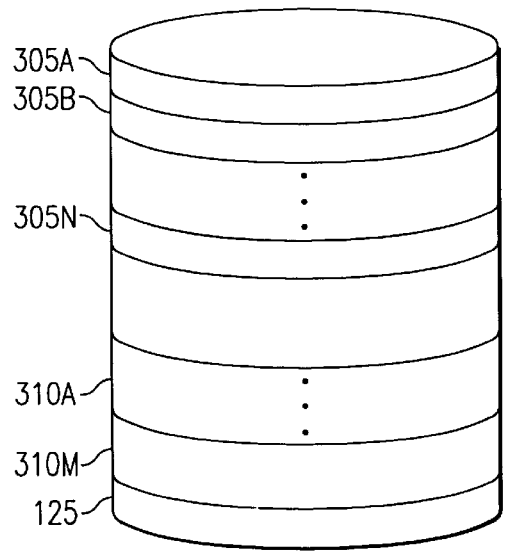
FIG. 2 depicts an exemplary storage unit and the display information contained therein in accordance with the teachings of the present invention.

Referring now to FIG. 2, it may be seen that in an exemplary arrangement of the display information stored in the storage unit 125 of the sub-system 115 (shown in FIG. 1), there is a first plurality of sponsor information portions, 305A through 305N, and a second plurality of application information portions, 310A through 310M. It is contemplated that the contents of the sponsor information portions 305A through 305N are provided to the storage unit 125 via either a vertical blanking interval ("VBI") associated with broadcast television signals received by the receiver 105 (shown in FIG. 1) or a portion of the bandwidth associated with digital television signals received by the receiver 105 in the Digital Satellite System ("DSS") standard. Further, it can be understood that storing (or, "downloading") the contents of the sponsor information portions 305A through 305N in the storage unit 125 may be a passive task, in the sense that it requires no user intervention.

Continuing to refer to FIG. 2, the contents of the application information portions 310A–310M may be any information that a viewer may be interested in, such as for example, content-based questionnaires, puzzles, arcade games, sports/entertainment trivia, et cetera. Therefore, it is envisioned that the content of the application information portions 310A–310M may be any combination of text, graphics or video information. Moreover, as can be readily appreciated, this portion of the display information may be pre-selected and prestored by a provider of the PCTV system 100 in conjunction with third-party content providers.

By storing both the sponsor information portions. 305A–305N and the application information portions 310A–310M in the storage unit 125 of the sub-system 115 (shown in FIG. 1), an instantaneous launch of the display of specific display information, which can be any binary combination of the sponsor information portions and application information portions, can be effectuated through intelligent caching and priority queuing of the storage unit information. Hereinafter, any small entertaining application, contained in one of the application information portions 310A–310M, that can be instantaneously launched from the RCU 130 (shown in FIG. 1) may be referred to as a "zapplet." As can be readily understood upon reference hereto, such a zapplet may be launched at any point in a primary viewing experience, including during broadcast TV commercials.

Figure 3:
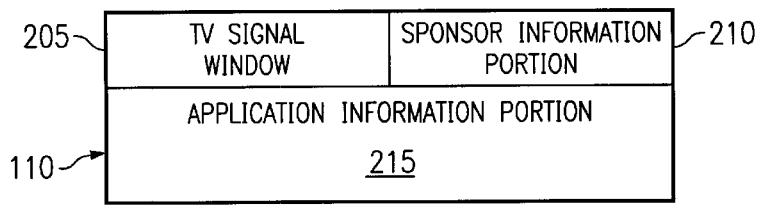
FIG. 3 depicts an exemplary representation of a display monitor for simultaneously displaying stored display information and broadcast television information in accordance with the teachings of the present invention.

Referring now FIG. 3, an exemplary representation of the display monitor 110 is depicted. Monitor 110 is capable of simultaneously displaying stored display information and broadcast television information in accordance with the teachings of the present invention. As can be seen, the viewing area of the monitor 110 may be partitioned preferably into a television signal window 205, a sponsor information portion window 210, and an application information portion window 215. The television signal window 205 provides for the display of the previously watched television program essentially as. a Picture-In-Picture ("PIP") window. The sponsor information portion window 210 provides the advertising space for a sponsor. This information may be a still frame that is compatible with the Joint Picture Experts Group ("JPEG") standard or a motion clip that is compatible with the Motion Picture Experts Group ("MPEG") standard, or a text message. The application information portion window 215 provides for the display of a zapplet, that is, any small entertaining application stored in one of the application information portions 310A–310M of the storage unit 125 (shown in FIG. 2). It can be readily appreciated upon reference hereto that the zapplet essentially becomes a "channel" that may be owned by a provider of the display system 100.

Continuing to refer to FIG. 3, although not shown in this Figure, it can be appreciated that additional "windows" may also be provided on the display monitor 110, such as for example, a clock window for displaying current time, an on-line programming directory window, a timer window for displaying the time elapsed since a zapplet is launched, et cetera.

It should now be appreciated by those skilled in the art that the present invention provides an innovative solution for displaying multiple experiences without the complete overriding of one experience over another by converging personal computer (PC) and television (TV) technologies to advantageously utilize the communication bandwidth, mass storage and graphics handling capability of the PC to deliver, store and display small applications during a traditional TV viewing environment. Further, because of this convergence, the display system of the present invention provides for on-the-fly fresh content for a secondary viewing experience in addition to augmenting sponsor information on the display monitor. The locally stored and overlaid digital zapplet effectively becomes a "channel" that is owned by a provider of the display system of the present invention.

Those skilled in the art should further appreciate that the teachings of the present invention can also be practiced in a Personal Computer ("PC") equipped with a TV tuner card that is capable of converting received TV signals into a form so that they can be displayed on a display monitor associated therewith.

Although only certain embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, a "tertiary" display source may also be provided with the PCTV system 100 of the present invention, such as for example a laser disc player or a VCR, and the stored zapplets may be launched to overlay the tertiary display source. Moreover, another usage model for the PCTV system 100 of the present invention may be had where a viewer/user is downloading information over the network 135 and through the communication port 140. The viewer/user has the option of launching a zapplet during the time taken for the downloading. It is also within the scope of the present invention to pre-select the contents of the sponsor information portions stored in the storage unit 125 for targeting a particular viewer/user. These and all other such extensions, modifications, rearrangements, substitutions and combinations are contemplated to be part of the scope of the present invention as defined by the following claims.

What is claimed is:

1. A display system, comprising:
   a display monitor;
   a broadcast television signal receiver operable in response to broadcast television signals to generate a display at a first area of said display monitor; and
   a control sub-system connected to and located proximate said receiver, said control sub-system including a storage unit to store a plurality of preselected items of application information at first individual storage locations of said storage unit; said control subsystem operable to store at second individual storage locations of said storage unit, a plurality of items of sponsor information downloaded via vertical blanking intervals or a select portion of a bandwidth associated with said broadcast television signals; wherein selective launching of a stored item of said application information, to generate a display at an area of said display monitor different from said first area, concurrently and without user intervention generates a display of a selectable item of said stored sponsor information at an area of said display monitor different from said first area without interrupting display of said broadcast television signals; and wherein display of an item of stored sponsor information in response to launching of a selected application information item is based on priority queuing of information items stored in said storage unit.

2. The system as recited in claim 1, wherein said receiver comprises an analog television receiving unit.

3. The system as recited in claim 1, wherein said receiver comprises a digital television receiving unit.

4. The system as recited in claim 1, wherein said receiver comprises a television tuner card.

5. The display system as recited in claim 1, wherein said sub-system further comprises:
   access control means; and
   a data communication port, wherein said data communication port and said access control means are operably coupled to a processor of said control sub-system.

6. The display system as recited in claim 1, wherein said display monitor, said receiver means, and said sub-system are integrated into a single unit.

7. The display system as recited in claim 1, wherein said storage unit comprises a magnetic storage device.

8. The display system as recited in claim 1, wherein said storage unit comprises an optical storage device.

9. The display system as recited in claim 1, wherein storage of said sponsor information items is effected independently of storage of said stored application information items.

10. The display system as recited in claim 1, wherein said control subsystem includes a processor operable to effect launching and display at a second area of said display monitor of a stored item of application information and concurrent display of a stored item of sponsor information at a third area of said display monitor.

11. The display system as recited in claim 1, wherein the stored items of application information include interactive applications.

12. The display system as recited in claim 1, wherein said stored items of sponsor information include passive display items.

13. The display system as recited in claim 1, wherein said stored items of sponsor information include one or both of JPEG and MPEG compatible items.

14. The display system as recited in claim 1, wherein said application information items can be selectively launched in response to a user operable actuator.

15. A method for enhancing user experience with a display system having a display monitor, a receiver for receiving broadcast television signals, and a sub-system with a non-volatile storage unit in which information to be displayed is stored, the non-volatile storage unit connected to an located proximate the receiver, the method comprising the steps of:

(A) storing, independently of reception of said broadcast television signals, application information items at a plurality of first individual storage locations of said non-volatile storage unit;

(B) receiving broadcast television signals to generate a display by said display monitor;

(C) during reception of broadcast television signals by said receiver, receiving sponsorship information items via a vertical blanking interval or a select portion of a digital bandwidth associated with said television signals and storing said sponsorship information items at a plurality of storage locations of said non-volatile storage unit different from said first individual storage locations; and (D) effecting user initiated launching of the display of an item of said stored application information at a user determined point during display of said broadcast television signals resulting in concurrent launching of the display of a stored item of said sponsorship information determined without user selection, and concurrently displaying the launched application information item and sponsorship information item at an area of said display monitor different from the display area of the broadcast television signal display, while continuing the display by said broadcast television signal.

16. The method as recited in claim 15, wherein said user initiation of launching of a said application content comprises manipulating a remote control unit operable in conjunction with said display system.

17. The method as recited in claim 15, wherein the broadcast television signal display is in a first window of said display monitor, the application information item display is in a second window of said display monitor, and the sponsorship information display is in a third window of said display monitor.

18. A display system, comprising:

a display monitor including separate first, second and third display windows;

a broadcast television signal receiver operable in response to broadcast television signals to generate a display in said first window of said display monitor; and a control subsystem including a processor and a storage unit;

said control sub-system including a storage unit to store a plurality of preselected items of application information at first individual storage locations of said storage unit; said control subsystem operable to store at second individual storage locations of said storage unit, a plurality of items of sponsor information downloaded via vertical blanking intervals or a select portion of a bandwidth associated with said broadcast television signals, and storage of said sponsor information items being independent of storage of said stored application information items; said subsystem processor operable under user control to launch a selected stored item of said application information and concurrently to launch a stored item of said sponsor information selected based on priority queuing of said stored information items, to generate a display of said selected application information item in said second window of the display monitor and concurrent display of the selected item of sponsor information in said third window of the display monitor, while permitting concurrent display in response to said broadcast television signal in the first window of the display monitor.

19. The display system as recited in claim 18, wherein the stored items of application information include interactive applications.

20. The display system as recited in claim 18, wherein said stored items of sponsor information include passive display items.

21. The display system as recited in claim 18, wherein said stored items of sponsor information include one or both of JPEG and MPEG compatible items.

22. The display system as recited in claim 21, wherein said application information items can be selectively launched in response to a user operable actuator.

23. A display system, comprising:

a display monitor;

a broadcast television signal receiver operable in response to broadcast television signals to generate a display at a first area of said display monitor; and a control sub-system connected to said receiver, said control sub-system including a storage unit to store a plurality of preselected items of application information at first individual storage locations of said storage unit; said control subsystem operable to store at second individual storage locations of said storage unit, a plurality of items of sponsor information downloaded via vertical blanking intervals or a select portion of a bandwidth associated with said broadcast television signals; said control sub-system permitting user controlled launching of individual stored items of said application information, to generate a display of a launched item of said application information at an area of said display monitor different from said first area and without user intervention concurrently to generate a display of a selectable item of said stored sponsor information at an area of said display monitor different from said first area without interrupting display of said broadcast television signals; wherein said display of a selectable item of stored sponsor information item is based on priority queuing of information items stored in said storage unit.

* * * * *